(No Model.)  3 Sheets—Sheet 1.
W. S. JOHNSON.
AUTOMATIC ELECTRIC TEMPERATURE REGULATOR.
No. 366,324. Patented July 12, 1887.
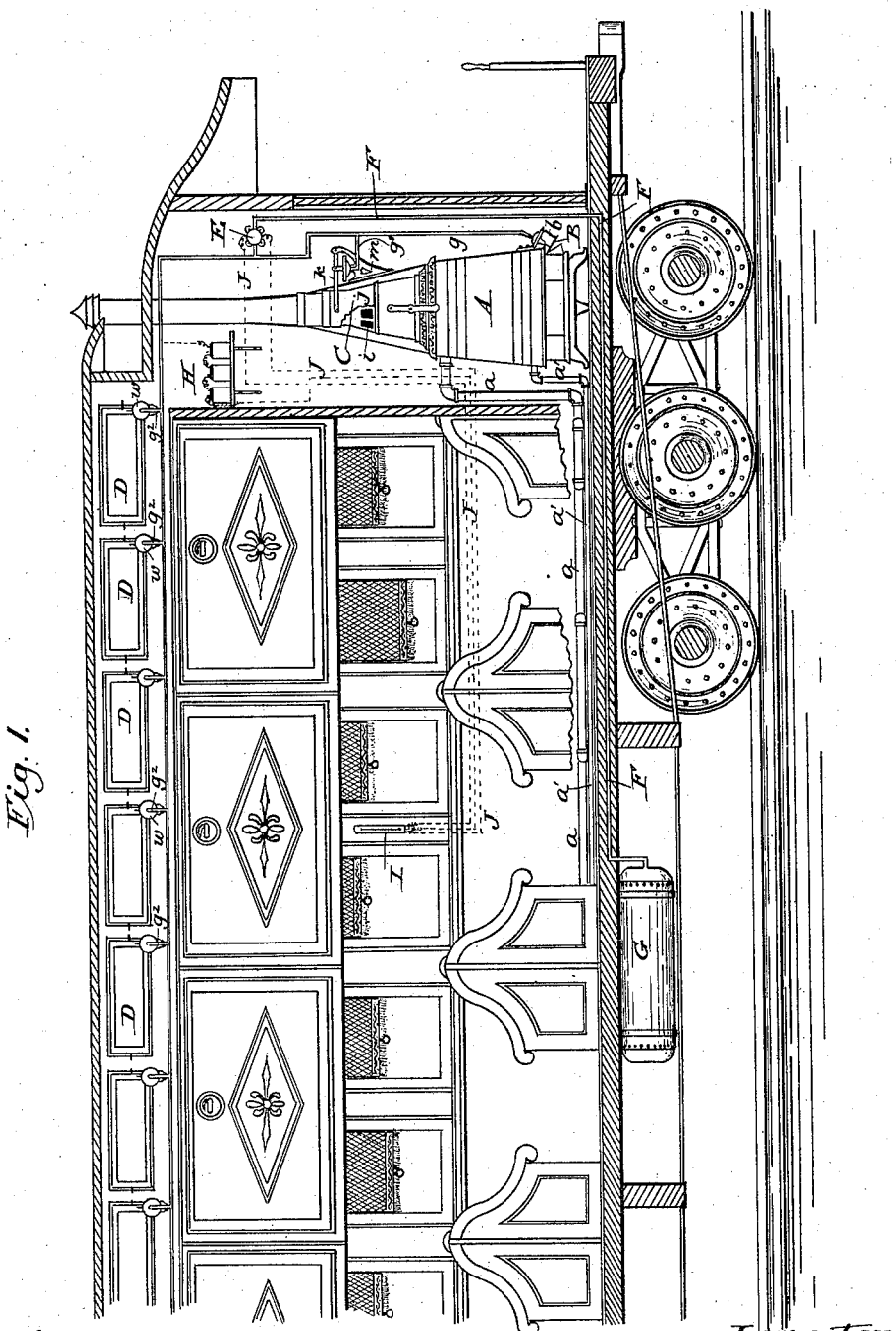

(No Model.) 3 Sheets—Sheet 2.
W. S. JOHNSON.
AUTOMATIC ELECTRIC TEMPERATURE REGULATOR.
No. 366,324. Patented July 12, 1887.
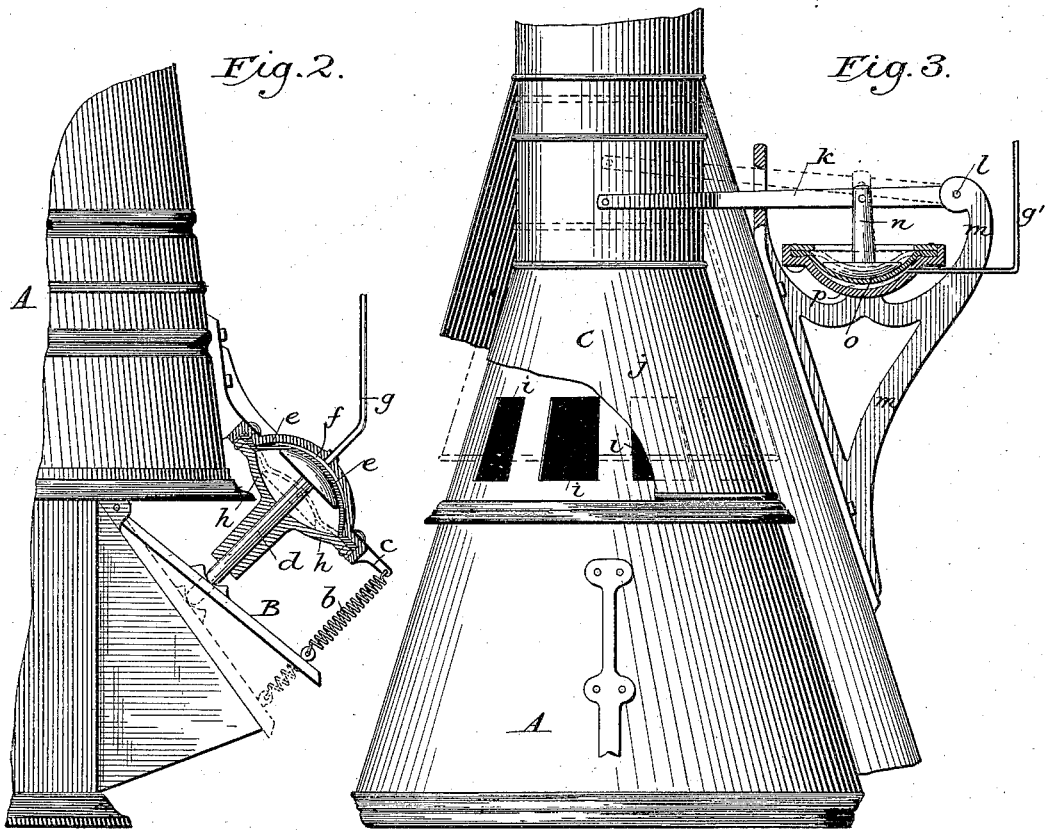
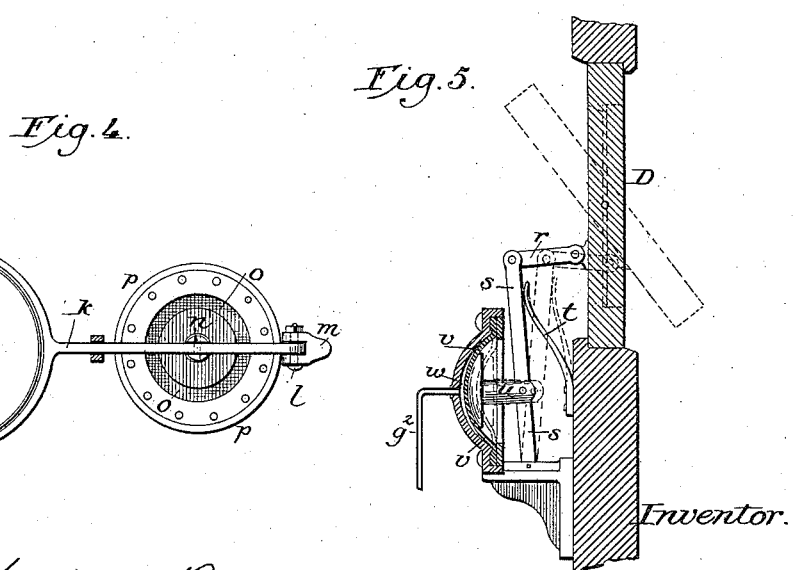

(No Model.) 3 Sheets—Sheet 3.
W. S. JOHNSON.
AUTOMATIC ELECTRIC TEMPERATURE REGULATOR.
No. 366,324. Patented July 12, 1887.
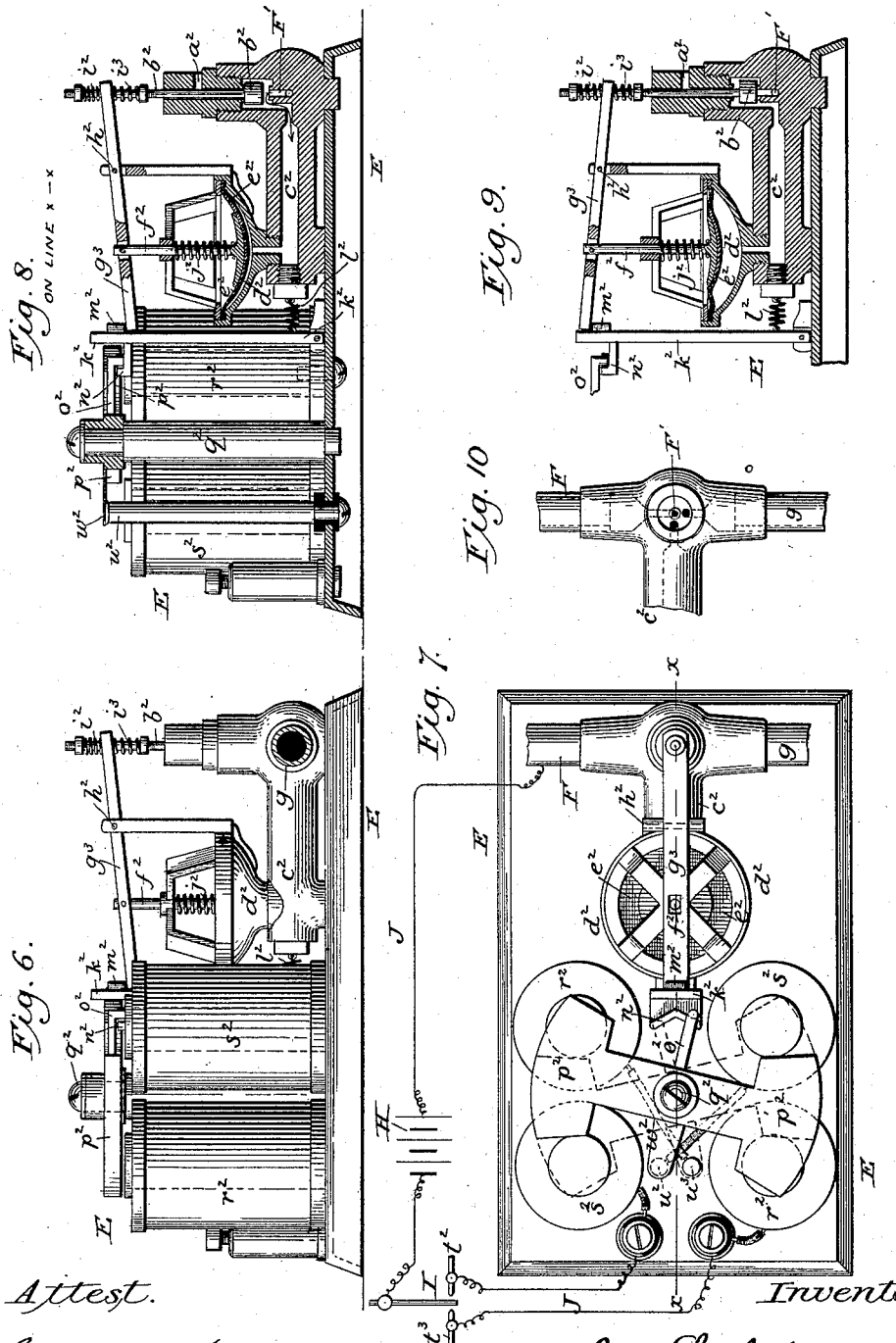

United States Patent Office.

WARREN S. JOHNSON, OF MILWAUKEE, WISCONSIN.

AUTOMATIC ELECTRIC TEMPERATURE-REGULATOR.

SPECIFICATION forming part of Letters Patent No. 366,324, dated July 12, 1887.

Application filed April 5, 1887. Serial No. 233,783. (No model.)

*To all whom it may concern:*

Be it known that I, WARREN S. JOHNSON, of Milwaukee, in the county of Milwaukee and State of Wisconsin, have invented certain Improvements in Automatic Temperature-Regulators, of which the following is a specification.

My invention relates to an apparatus for automatically controlling temperature, designed more particularly for use in connection with railway-cars, but applicable, also, for controlling temperature in buildings and elsewhere.

The invention embraces devices actuated by fluid-pressure for controlling the valves or dampers of a heating apparatus, valves or ventilators actuated by fluid-pressure for permitting the escape of the heated air, an electrically-actuated valve through which the delivery of the fluid under pressure to the aforesaid devices is controlled, and thermostatic devices for controlling said electric valve, the parts being so organized that when the temperature exceeds the proper limit the ventilators will be opened and the action of the heater checked, and that when, on the contrary, the temperature falls below the proper limit the ventilators will be closed and the action of the heater increased.

The invention also relates to various improvements pertaining to the electric controlling-valve, and to the other details of the apparatus.

Figure 1 is a longitudinal vertical section through one end of a railway-car provided with my system of apparatus. Fig. 2 is an elevation showing the draft-door of the furnace with my controlling devices applied thereto, these devices being shown in vertical section. Fig. 3 is an elevation showing the upper part of the furnace with the check-draft and my devices for controlling the same, the devices being shown in vertical section. Fig. 4 is a top plan view of the parts represented in the preceding figure. Fig. 5 is a vertical cross-section through one of the ventilator or outlet valves, and the mechanism for controlling the same. Fig. 6 is a side elevation of the electromagnetic valve and connections for controlling the flow of the fluid by which the draft-door, the check-draft, and the ventilator are actuated. Fig. 7 is a top plan view of the same. Fig. 8 is a vertical longitudinal section on the line $x\,x$ of the preceding figure. Fig. 9 is a section through one end of the same with the parts in a different position. Fig. 10 is a plan view illustrating the arrangement of the valve ports or passages for the fluid.

Referring to the drawings, A represents the heating apparatus, which, in the present instance, is an ordinary Baker Hot-Water Heater, provided with a system of circulating-pipes, $a\,a'$, by which the water is distributed throughout the car and returned to the heater. This heater is provided at its base with the usual draft-door, B, the closing of which checks the combustion, and is also provided at its top with a damper or check-draft, C, the purpose of which is to assist in checking combustion when the temperature of the car is to be diminished. At its top and elsewhere, if required, the car is provided with the pivoted ventilators or valves D, the opening of which will permit the heated air to escape from the interior of the car.

An increase in the temperature of the car is effected by closing the ventilators D to prevent the escape of air, and closing the check-draft C and opening the draft-door B to increase the combustion in the heater. On the contrary, a diminution of the temperature is secured by opening the ventilators and the check-draft and closing the draft-door B. It is the purpose of my appliances to effect these operations automatically; and to this end I construct the parts as follows: To the draft-door B, I connect a lifting-spring, $b$, secured at the opposite end to an arm, $c$, or other suitable support. Against the door I seat a sliding spindle, $d$, the upper end of which is expanded into a head and seated against the under side of a flexible diaphragm, $e$, which latter is extended across and forms the lower wall of a chamber, $f$, which is supplied at the proper times, through a pipe, $g$, with air or other fluid under pressure. This fluid, depressing the diaphragm, which is in fact but a movable wall for the chamber, forces the spindle $d$ downward and causes it to close the draft-door B, thus checking the combustion. When the fluid is permitted to escape, the spring again opens the door. The chamber $f$ may be formed in any suitable manner; but I prefer, as shown in the drawings, to employ a casting having a chamber therein with one end adapted to be bolted to the furnace, and the opposite end adapted to receive the spring $b$.

I secure the diaphragm in place by a plate, $h$, bearing at its periphery thereon, and provided with a central tubular neck to guide the spindle $d$. It will be understood, however, that these matters of detail may be varied at will.

The check-draft C is constructed as follows: The heater is provided at the top with numerous air-inlets, $i$, communicating directly with the smoke-pipe, and closed by means of a vertically-movable encircling hood or cone, $j$, pivoted in the forked end of a lifting-lever, $k$, pivoted in its turn at $l$ to a stationary bracket, $m$, or other support. Between its ends the lever $k$ is supported by a spindle, $n$, the lower end of which is enlarged and seated on a flexible diaphragm, $o$, forming the upper wall of a chamber, $p$, which latter is provided with a pipe, $g'$, for the admission of air or other fluid under pressure. When this fluid is admitted, it lifts the diaphragm, and, through the intermediate parts, the cone or check-draft $j$.

The ventilators D, as shown in the drawings, are pivoted at their ends, after the manner of a butterfly-valve, and are each connected by a link, $r$, or otherwise, to the upper end of a lever, $s$, which is pivoted to a fixed support at its opposite end, and acted upon by a spring, $t$, which tends to close the ventilator. The lever $s$ is connected midway of its length, or thereabout, to a spindle, $u$, the end of which is enlarged and seated against a flexible diaphragm, $v$, forming one wall of the chamber $w$, which receives fluid under pressure through a pipe, $g^2$. When the fluid is admitted, it expands the chamber, or, in other words, forces the diaphragm outward, and through the intermediate parts effects the opening of the ventilator.

It will be observed that the devices for operating the draft-door, the check-draft, and the ventilators closely resemble each other in construction, each having as its fundamental feature an expansible chamber whose movable wall is connected with the part to be moved. For convenience of reference, and to avoid needless repetition, I will hereinafter designate these contrivances as "fluid-pressure" devices.

The pipes $g$, $g'$, and $g^2$, through which the fluid for operating the draft-door, the draft-check, and the ventilators is delivered, are all controlled by an electro-magnetic valve, E, by which the fluid is delivered into and permitted to escape from said pipes as required. This valve, which will be hereinafter described in detail, communicates with a supply-pipe, F, through which the air or other fluid under pressure is received from any suitable source of supply. In the present instance it is connected with a receiver or reservoir, G, located beneath the car and constituting a part of the usual air-brake mechanism.

The valve E is connected by suitable electric conductors with a battery or other generator, H, and with a thermostat, I, the construction being such that when the temperature exceeds a predetermined limit the thermostat will establish the circuits in such manner that the valve E is caused to admit air to the pipes, $g$ $g'$, &c., and that when the temperature falls below a prescribed limit the thermostat will so establish the circuits that the valve will shut off the flow of fluid and permit that which had already passed into the pipes $g$ $g'$, &c., to escape.

I will now describe the construction of the valve, referring particularly to Figs. 6 to 10. The supply-pipe F terminates within the valve in a delivery-throat, F', connected when open directly with the pipes $g$ $g'$, &c., as shown. A port, $a^2$, opens through the top of the valve to permit the escape of the air from the pipes $g$ $g'$, &c., when required. A vertical movable spindle, $b^2$, serves to close the ports F' and $a^2$ alternately. When lifted, as in Fig. 8, it permits the fluid to pass from the supply-pipe into the smaller pipes, $g$ $g'$, &c.; but when depressed, as in Fig. 9, it prevents the further admission of the fluid and permits the fluid which had previously entered the pipes $g$ $g'$, &c., to escape into the air, thus releasing the various diaphragms from pressure. The inlet-port also connects through a pipe, $c^2$, with a chamber, $d^2$, the upper wall of which is formed by a flexible diaphragm, $e^2$, supporting a spindle, $f^2$. This spindle is connected at its upper end to a lever, $g^3$, pivoted at $h^2$. This lever at one end encircles the valve-spindle $b^2$, and rests between two springs, $i^2$ and $i^3$. As the fluid is admitted through the supply-port into the pipes for operating the draft-door, ventilator, &c., it also passes into the chamber $d^2$, and, raising the diaphragm $e^2$, acts through the intermediate parts to close the inlet valve or spindle $b^2$, whereby the admission of the fluid is stopped. Thus it is that the inflowing fluid is applied to check its admission.

A spring, $j^2$, tends to depress the diaphragm and through the intermediate parts open the valve $b^2$ as soon as the pressure is relieved by the escape of air through the waste-port $a^2$. In order therefore to prevent the opening and closing of the valve, except at those times when it is required to operate the parts which directly control the damper, I make use of a magnetic locking device, now to be described. An arm, $k^2$, pivoted to a suitable support at its lower end and acted upon by a spring, $l^2$, has near its upper end a stud, $m^2$. When the inlet-valve spindle $b^2$ is opened to admit the air, the shoulder $m^2$ locks over the lever $g^3$, as in Fig. 8, and holds the valve open. When, on the contrary, the valve is closed, the shoulder $m^2$ locks beneath the lever, as in Fig. 9, and prevents the opening of the valve. To effect the disengagement of this locking device at the proper time, I provide its upper end with an oblique or V-shaped rib, $n^2$, acted upon by the end of a vibratory arm, $o^2$, attached firmly to a horizontally-vibrating armature, $p^2$, pivoted at $q^2$, as shown. Two electro-magnets, $r^2 r^2$ and $s^2 s^2$, have their poles arranged adjacent to the ends of this armature and in such manner that when the magnet $r^2$ is excited it will draw the armature to the position shown in Fig. 7, and that when, on the other hand, the magnet $s^2$ is excited it will turn the armature to the position indicated by dotted lines. In this change from one position to the other the armature causes the arm $o^2$ to release the lever $g^3$, so that its position and the position of the valve $b^2$ may be changed. As the armature completes its movement the valve-locking devices are released and permitted to hold the valve in its new position.

The electric connections are as follows: The conductor J communicates at one end, through the metallic parts of the apparatus, with the arm $g^3$, and at the opposite end, through the battery $k$, with the thermostat I. As shown, this thermostat is of the usual compound-bar type, in which the conducting-bar is thrown to the right or the left, according as the temperature rises or falls. The bar stands between two conducting-fingers, $t^2$ and $t^3$. The finger $t^2$ is at the termination of a conductor which communicates, through the coils of the magnet $s^2$, with a post, $u^2$, while the finger $t^3$ is at the end of a conductor which communicates, through the coils of the magnet $r^2$, with a conducting-post, $u^3$. The posts $u^2$ and $u^3$ are insulated from the remainder of the apparatus.

The armature is provided with a conducting-finger, $w^2$, which makes connection with the posts $u^2$ and $u^3$ alternately as the armature is moved to and fro. As the armature is drawn by a magnet into one position its arm $w^2$ breaks the circuit through that magnet and immediately closes the circuit through the opposite magnet, the second circuit being, however, broken at the thermostat. This leaves the parts in such position that when the second circuit is closed by the thermostat the armature will immediately be drawn to a new position. In short, the movement of the armature by either magnet effects the discharge of that magnet and the adjustment of the parts, so that the opposite magnet may be called into action by the thermostat to change the position of the armature.

The action is as follows: In the normal position of the parts the draft-door B is open, the check-draft C closed, and the ventilators D also closed. This causes the heater to continue its action and the heated air to be returned within the car. At this time the valve stands in the position shown in Fig. 9, so that the admission of the fluid from the supply-pipe F is prevented and the armature stands in the position shown in Fig. 7. As soon as the temperature exceeds the proper limit the thermostat closes the circuit through the finger $t^2$, causing the excitation of the magnet $s^2$, which immediately turns the armature to the position shown in dotted lines in Fig. 7. During this movement of the armature its arm $o^2$ causes the shoulder $m^2$ to unlock the lever $g^3$, whereupon the spring $j^2$ instantly opens the valve $b^2$. This permits the fluid to flow from the supply-pipes to the pipes $g$ $g'$, &c., closing the draft-door and opening the check-draft and ventilators, as before explained. As the armature completes its movement it permits the shoulder $m^2$ to lock over the lever $g^3$ and hold the valve $b^2$ open, as in Figs. 6 and 8. Therefore the flow of fluid into the system is continued. As the armature completes its movement its conducting-finger $w^2$ leaves the post $u^2$ and meets the post $u^3$, thus breaking the circuit just employed and completing the circuit through the magnet $r^2$, except at the thermostat, where it remains open. The parts continue in this position until the temperature falls below the fixed point, when the thermostat completes the circuit through the finger $t^3$ and magnet $r^2$, whereupon the armature is immediately restored to the position shown in Fig. 7. In thus moving it again releases the lever $g^3$ from the locking shoulder $m^2$, the release being instantly followed by the closing of the valve $b^2$, which is effected by the pressure of the fluid acting through the diaphragm $d^2$, as before explained. As the armature resumes its original and normal position the shoulder $m^2$ again locks the valve closed, as already explained.

In my Patent No. 342,018 is illustated a valve operated by a magnet and connected to a spring, which being carried past the center acts to throw and hold the valve first in one direction and then in the other. It will be observed that the present organization differs therefrom in having a latch or locking device which acts positively to hold the valve in its different positions, the magnet acting simply to disengage this locking device and hold it out of action while the valve is moving from one extreme to the other.

It will be observed that the draft-door and the check-draft of the heater herein shown are in fact but valves to control its action, and that they may be replaced by equivalent valves or devices, such as are in common use for a like purpose.

While I have described herein the employment of two magnets to actuate the detent of the secondary valve, it is to be understood that a single magnet with a polarized armature or other equivalent magnetic arrangement, such as will suggest itself to any person skilled in the art, may be substituted.

While I have illustrated and described a series of connecting ventilators or valves for discharging the heated air, it is manifest that their number may be increased or diminished as circumstances may demand, my invention contemplating the use of one or more of these exhaust-valves in combination with the other members of the system herein shown.

In the drawings I have selected, for the purpose of illustration, a familiar form of boiler, having its draft controlled, as usual, by the two valves or dampers, one above and the other below the fire-chamber, and have consequently shown my controlling devices connected to both of these valves; but it is evident that when using a heater with a single controlling door or valve one of the expansion-chambers, $p$ or $f$, as the case may be, will be omitted.

Having thus described my invention, what I claim is—

1. In a system for regulating the temperature of a car or apartment, a heating apparatus, a valve to control its action, and fluid-pressure devices to actuate said valve, in combination with a valve to control the escape of the heated air from the apartment, and fluid-pressure devices to actuate said valve, a pipe leading from a source of fluid-pressure supply to the said fluid-pressure devices, an electrically-actuated valve to control the delivery of said fluid, and a thermostat electrically connected with said valve to control its action, whereby an increase in the temperature is caused to check the action of the heater and to permit the escape of the heated air, and vice versa.

2. The valve-body provided with an inlet-port, F', a delivery-port, and a waste-port, in combination with the valve arranged to close the waste and delivery ports alternately, the expansion-chamber receiving fluid through the inlet-port and intermediate connections, whereby the expansion of the chamber is caused to actuate the valve and close the inlet-port.

3. The combination of the valve $b^2$, the expansion-chamber receiving fluid past said valve, and intermediate connections through which the expansion of the chamber closes the valve, a spring tending to open the valve, an electrically-actuated detent by which the valve is locked open and shut, and a thermostat and electric connections controlling the detent.

4. In an electrically-actuated three-way valve, the combination of the valve proper, an expansion-chamber to which fluid under pressure is admitted by said valve, and intermediate devices through which the expansion of the chamber causes the valve to close the inlet-port, and an electrically-actuated detent to hold the valve in position.

5. A main valve adapted to be operated by fluid-pressure, in combination with a secondary valve which controls said fluid-pressure and thereby the main valve, an expansion-chamber which is alternately expanded and collapsed by the admission and delivery of fluid received through the secondary valve, and suitable connections whereby the expansion-chamber directly operates the secondary valve.

6. In combination with the valve $b^2$, the detent to hold the same open and shut, the rib $n^2$ thereon, the vibrating armature having the arm to engage the rib and move the detent, and electro-magnetic actuating devices for said armature.

7. The two magnets, the thermostat, and two circuits embracing the respective magnets and controlled by the thermostat, in combination with the vibratory armature and the circuit-changer or switch actuated by the armature, a valve and a valve-locking device, also actuated by the armature, whereby an extreme change in the temperature in either direction is caused to momentarily unlock the valve, open the circuit last called into use, and establish proper connections to admit of the other circuit being called into action by the thermostat when the temperature changes to the other extreme.

8. In combination with the valve $b^2$, the expansion-spring $j^2$, the expansion-chamber, and the intermediate lever, $g^3$, the springs $i^2$ and $i^3$.

In testimony whereof I hereunto set my hand, this 29th day of March, 1887, in the presence of two attesting witnesses.

WARREN S. JOHNSON.

Witnesses:
   ROBERT R. HOSKING,
   ALFRED MORAWETZ.